(12) United States Patent
Wu et al.

(10) Patent No.: US 11,201,895 B2
(45) Date of Patent: Dec. 14, 2021

(54) APPARATUS FOR GENERATING HETEROGENEOUS FUNCTIONAL EQUIVALENT AND METHOD THEREOF

(71) Applicants: SHANGHAI HONGZHEN INFORMATION SCIENCE & TECHNOLOGY CO. LTD, Shanghai (CN); CHINA NATIONAL DIGITAL SWITCHING SYSTEM ENGINEERING & TECHNOLOGICAL R&D CENTER, Henan (CN)

(72) Inventors: Jiangxing Wu, Zhengzhou (CN); Hongchang Chen, Zhengzhou (CN); Peng Yi, Zhengzhou (CN); Hailong Ma, Zhengzhou (CN); Lei He, Zhengzhou (CN); Junfei Li, Zhengzhou (CN); Jianmin Pang, Zhengzhou (CN)

(73) Assignees: Shanhai Hongzhen Information Science & Technology Co. Ltd., Shanghai (CN); China National Digital Switching System Engineering & Technological R&D Center, Henan (CN)

( * ) Notice: Subject to any disclaimer, the term of this patent is extended or adjusted under 35 U.S.C. 154(b) by 457 days.

(21) Appl. No.: 16/330,691

(22) PCT Filed: Sep. 1, 2017

(86) PCT No.: PCT/CN2017/100197
§ 371 (c)(1),
(2) Date: Mar. 5, 2019

(87) PCT Pub. No.: WO2018/059187
PCT Pub. Date: Apr. 5, 2018

(65) Prior Publication Data
US 2021/0288975 A1 Sep. 16, 2021

(30) Foreign Application Priority Data

Sep. 27, 2016 (CN) .......................... 201610856793.6

(51) Int. Cl.
*H04L 9/00* (2006.01)
*H04L 29/06* (2006.01)

(52) U.S. Cl.
CPC ........ *H04L 63/145* (2013.01); *H04L 63/1416* (2013.01); *H04L 63/1425* (2013.01)

(58) Field of Classification Search
CPC ............... H04L 63/145; H04L 63/1425; H04L 63/1416
See application file for complete search history.

(56) References Cited

U.S. PATENT DOCUMENTS 6,243,851 B1 6/2001 Hwang et al.
9,170,790 B2 * 10/2015 Balasubramanian ... G06F 8/443
(Continued)

FOREIGN PATENT DOCUMENTS

CN 102801750 A 11/2012
CN 103368858 A 10/2013
(Continued)

OTHER PUBLICATIONS

Extended European Search Report regarding Application No. 17854638.8 dated Oct. 31, 2019.
(Continued)

*Primary Examiner* — Beemnet W Dada
(74) *Attorney, Agent, or Firm* — Harness, Dickey & Pierce, P.L.C.

(57) ABSTRACT

An apparatus for generating heterogeneous functional equivalent and method thereof includes: a heterogeneous functional equivalent generator and an element pool connected to the heterogeneous functional equivalent generator, where the element pool includes at least one element. The heterogeneous functional equivalent generator is configured
(Continued)

to obtain a generation policy and is further configured to select element sets corresponding to the number from the element pool according to the generation policy. The heterogeneous functional equivalent generator is further configured to generate the number of heterogeneous functional equivalents based on the selected element sets. Because the elements for constructing heterogeneous functional equivalents are different, the relationship between element and service response output by the heterogeneous functional equivalent to outside is uncertain, thereby making it uneasy to sniff an unknown defect or a backdoor of the heterogeneous functional equivalent, and lowering the success rate of an intruder's attack on the heterogeneous functional equivalent.

15 Claims, 4 Drawing Sheets

(56) References Cited

U.S. PATENT DOCUMENTS

| | | | | |
|---|---|---|---|---|
| 9,479,529 | B2* | 10/2016 | Yang | G06F 21/55 |
| 9,792,158 | B2* | 10/2017 | Chai | G06F 9/52 |
| 10,795,976 | B2* | 10/2020 | Canedo | A61K 31/047 |
| 10,834,101 | B2* | 11/2020 | Ficarra | G06F 9/45529 |
| 2006/0095570 | A1 | 5/2006 | O'Sullivan | |
| 2010/0281459 | A1* | 11/2010 | Betouin | G06F 21/14 717/106 |
| 2020/0394315 | A1* | 12/2020 | Wu | G06F 21/57 |

FOREIGN PATENT DOCUMENTS

| | | |
|---|---|---|
| CN | 106156631 A | 11/2016 |
| CN | 106549935 A | 3/2017 |
| WO | WO-2011116446 A1 | 9/2011 |

OTHER PUBLICATIONS

Gao, Gui-jun et al., "On Deisgn Technology of Fault-tolerant System Based on Evolvable Hardware," Information and Control, vol. 37, No. 3, Jun. 2008, pp. 370-376.

International Search Report (in English and Chinese) and Written Opinion of the International Searching Authority (in Chinese) issued in PCT/CN2017/100197, dated Nov. 30, 2017; ISA/CN.

* cited by examiner

APPARATUS FOR GENERATING HETEROGENEOUS FUNCTIONAL EQUIVALENT AND METHOD THEREOF

The present disclosure is a 371 National Phase of International Application PCT/CN2017/100197, filed on Sep. 1, 2017, which claims priority to Chinese Patent Application No. 201610856793.6, filed with the Chinese Patent Office on Sep. 27, 2016 and entitled "APPARATUS FOR GENERATING HETEROGENEOUS FUNCTIONAL EQUIVALENT AND METHOD THEREOF", both of which are incorporated herein by reference in their entireties.

TECHNICAL FIELD

The present invention relates to the field of cyberspace security defense technologies, and in particular, to an apparatus for generating heterogeneous functional equivalent and method thereof.

BACKGROUND OF THE INVENTION

Computers and a cyberspace environment composed of computers bring great convenience to people's life, work, and study. The cyberspace environment composed of computers includes a network device terminal (e.g., a mobile phone or a computer), software (e.g., a browser or communication software) running on the terminal and related to a network, a server, various devices (e.g., a switch and a router) providing interconnections for the network, etc.

Apparatuses in the cyberspace field may be composed of a system, a subsystem, a unit, a module, a component, or a device. A structure state presented outwardly by these apparatuses is referred to as structure characterization. For an apparatus with a given service function in the existing cyberspace field, there is a certain mapping relationship between its exterior structure form and interior structure form, and this mapping relationship is usually static and determinate as for a technical architecture in the cyberspace field. Particularly, most redundant systems in the prior art are homogeneous redundant systems, the interior implementation mechanism of which has similar relationships to the exterior structure to some extent. By analyzing such relationships, information about interior software and hardware structures of a related apparatus can be obtained indirectly, and it is possible to further attack or intrude into the apparatus by sniffing or scanning an utilizable unknown defect or finding a contact channel to activate a trapdoor (backdoor), which poses threats to information security or network security of the apparatus. Therefore, designing and implementing a network apparatus based on an idea of heterogeneous redundancy can greatly improve security and reliability of the apparatus.

How to generate a plurality of high-quality heterogeneous functional equivalents is the key to implement a heterogeneous redundant system.

SUMMARY OF THE INVENTION

This application provides an apparatus for generating heterogeneous functional equivalent and method thereof, so as to improve security of an apparatus in cyberspace.

A first aspect provides an apparatus for generating heterogeneous functional equivalent, comprising: a heterogeneous functional equivalent generator and an element pool connected to the heterogeneous functional equivalent generator, where the element pool includes at least one element, wherein the heterogeneous functional equivalent generator is configured to obtain a generation policy, where the generation policy includes a function list for selecting an element according to a function and a number of heterogeneous functional equivalents to be generated;

the heterogeneous functional equivalent generator is further configured to select element sets corresponding to the number from the element pool according to the generation policy, where each of the element sets is a set comprising at least one element for constructing a heterogeneous functional equivalent; and the heterogeneous functional equivalent generator is further configured to combine the selected element sets to generate the number of heterogeneous functional equivalents.

According to an apparatus for generating heterogeneous functional equivalent and method thereof provided in this aspect, different elements are selected from an element pool according to a generation policy, and these elements are combined to generate a plurality of different heterogeneous functional equivalents, so that sufficient heterogeneous functional equivalents are available to a heterogeneous redundant system, which resolves a problem in generating a heterogeneous functional equivalent in the heterogeneous redundant system.

In addition, a particular number of element sets are selected from the element pool according to a certain generation policy, so that the generated heterogeneous functional equivalents are flexible and variable, which prevents an unknown defect, e.g., a trapdoor or a backdoor, in a network apparatus from being snooped and attacked, and improves network system security.

Further, the apparatus further includes a template pool including at least one template, and the generation policy further includes at least one template selected from the template pool, where the heterogeneous functional equivalent generator is further configured to combine or compile the element sets selected from the element pool and the selected at least one template, to generate the number of heterogeneous functional equivalents. Different templates are selected from the template pool, so that the generated heterogeneous functional equivalents are more stable and secure.

Further, the heterogeneous functional equivalent generator is specifically further configured to search in the element pool according to the function list in the generation policy, and select the element sets corresponding to the number. By means of the function list in the generation policy, elements in the element pool are classified according to different functions, thereby making it convenient to search for and find an element for generating a heterogeneous functional equivalent.

Further, the heterogeneous functional equivalent generator is specifically further configured to: obtain the attribute value of each element and the heterogeneous degree between any two elements in the element pool, and the attribute value of the template and the heterogeneous degree between two templates; and select the element sets corresponding to the number from the element pool according to the generation policy, the attribute value of each element and the heterogeneous degree between any two elements with a same-function, and the attribute value of the template and the heterogeneous degree between the two templates, where the attribute value of each element includes reliability, complexity, or use frequency of each element, and the heterogeneous degree is the difference degree between any two elements with the same function.

The attribute values of elements, the heterogeneous degree between two elements, and the attribute value of the selected template and the heterogeneous degree between different templates are calculated, so that the generated heterogeneous functional equivalents are of higher quality as for the overall attribute, and the capability of the heterogeneous functional equivalents in resisting external attack and snooping is enhanced.

Further, the template includes a same template or different templates, and the different templates indicate different templates used to generate heterogeneous functional equivalents with a same function. Because each heterogeneous functional equivalent is formed by combining or compiling at least one element by using a template, different templates enable the generated heterogeneous functional equivalents to have a plurality of functions, and to provide different functions according to external services, while the exterior structures of these heterogeneous functional equivalents the same, and function switching is performed only in the heterogeneous functional equivalents. Therefore, the capability of the heterogeneous functional equivalents in resisting intrusion and attack is enhanced, and network security is further improved.

Further, the heterogeneous functional equivalent generator is configured to obtain the generation policy by reception from outside, generation from inside or in a manner of combining reception from outside and generation from inside. In this way, the generated generation policy is random and variable, which prevents the generation policy from being easily attacked or intruded due to a monotonous mode.

A second aspect provides a method for generating heterogeneous functional equivalent generation, comprising:

obtaining a generation policy, where the generation policy includes a function list for selecting an element according to a function and the number of heterogeneous functional equivalents to be generated; selecting element sets corresponding to the number from the element pool according to the generation policy, where each of the element sets is a set comprising at least one element for constructing a heterogeneous functional equivalent; and combining the selected element sets to generate the number of heterogeneous functional equivalents.

Further, if the generation policy further includes at least one template selected from a template pool, combining the selected element sets to generate the number of heterogeneous functional equivalents includes: combining or compiling the element sets selected from the element pool and the selected at least one template, to generate the number of heterogeneous functional equivalents.

Further, selecting element sets corresponding to the number from the element pool according to the generation policy includes: searching in the element pool according to the function list in the generation policy, and selecting the element sets corresponding to the number.

Further, selecting element sets corresponding to the number from the element pool according to the generation policy further includes: obtaining the attribute value of each element and the heterogeneous degree between any two elements in the element pool, and the attribute value of the template and the heterogeneous degree between two templates; and selecting the element sets corresponding to the number from the element pool according to the generation policy, the attribute value of each element and the heterogeneous degree between any two elements with a same function, and the attribute value of the template and the heterogeneous degree between the two templates, where the attribute value of each element includes reliability, complexity, or use frequency of each element, and the heterogeneous degree is a difference degree between any two elements with a same function.

Further, the template includes a same template or different templates, and the different templates indicate different templates used to generate heterogeneous functional equivalents with a same function.

Further, obtaining a generation policy includes: obtaining the generation policy by reception from outside, generation from inside or in a manner of combining reception from outside and generation from inside.

A third aspect provides an element pool, where the element pool is connected to the heterogeneous functional equivalent generator, and configured to provide element sets to the heterogeneous functional equivalent generator according to the generation policy, where the element pool comprises at least one element, each element has a function, and the element set is a set comprising at least one element for constructing a heterogeneous functional equivalent.

A fourth aspect provides a template pool, where the template pool is connected to the heterogeneous functional equivalent generator, and configured to provide a template to the heterogeneous functional equivalent generator, where the template pool comprises at least one template, and each template is used to combine or compile elements selected from the element pool, so that the generated heterogeneous functional equivalents have at least one function.

A fifth aspect provides a heterogeneous functional equivalent generator, including a transceiver and a processor, where the transceiver is configured to obtain a generation policy, where the generation policy includes a function list for selecting an element according to a function and the number of heterogeneous functional equivalents to be generated; and the processor is configured to select element sets corresponding to the number from the element pool according to the generation policy, and combine the selected element sets to generate the number of heterogeneous functional equivalents, where each of the element sets is a set comprising at least one element for constructing a heterogeneous functional equivalent.

Further, if the generation policy further includes at least one template selected from the template pool, the processor is further configured to combine or compile the element sets selected from the element pool and the selected at least one template, to generate the number of heterogeneous functional equivalents.

Further, the processor is configured to select the element sets corresponding to the number from the element pool according to the generation policy, the attribute value of each element and the heterogeneous degree between any two elements with a same function, and the attribute value of the template and the heterogeneous degree between two templates, where the attribute value of each element includes reliability, complexity, or use frequency of each element, and the heterogeneous degree indicates the difference degree between any two elements with a same function.

Further, the generator further includes a memory, where the memory stores the generation policy and the generated heterogeneous functional equivalents, and the transceiver is further configured to output the generated heterogeneous functional equivalents.

Further, the memory stores an attribute value database and a heterogeneous degree database, where the attribute value database is configured to store the attribute value of each element in the element pool; and the heterogeneous degree database is configured to store the heterogeneous degree between any two elements with a same function.

A sixth aspect further provides a computer storage medium, where the computer storage medium is capable of storing a program, and when being executed, the program is capable of performing some or all of the steps in implementations of the apparatus for generating heterogeneous functional equivalent and method thereof provided in the present invention.

BRIEF DESCRIPTION OF THE DRAWINGS

In order to describe the technical solutions in the embodiments of the present invention or in the prior art more clearly, the following briefly describes the accompanying drawings required for describing the embodiments or the prior art. Apparently, a person of ordinary skill in the art may still derive other drawings from these accompanying drawings without creative efforts.

DETAILED DESCRIPTION OF THE EMBODIMENTS

In order to make persons skilled in the art understand the technical solutions in the present invention better, the technical solutions in the embodiments of the present invention are described below more clearly and completely with reference to the accompanying drawings for the embodiments of the present invention. Apparently, the described embodiments are merely some rather than all of the embodiments of the present invention.

According to an embodiment of the present invention, an apparatus for generating heterogeneous functional equivalent is provided, so as to improve cyberspace security.

Figure 1:
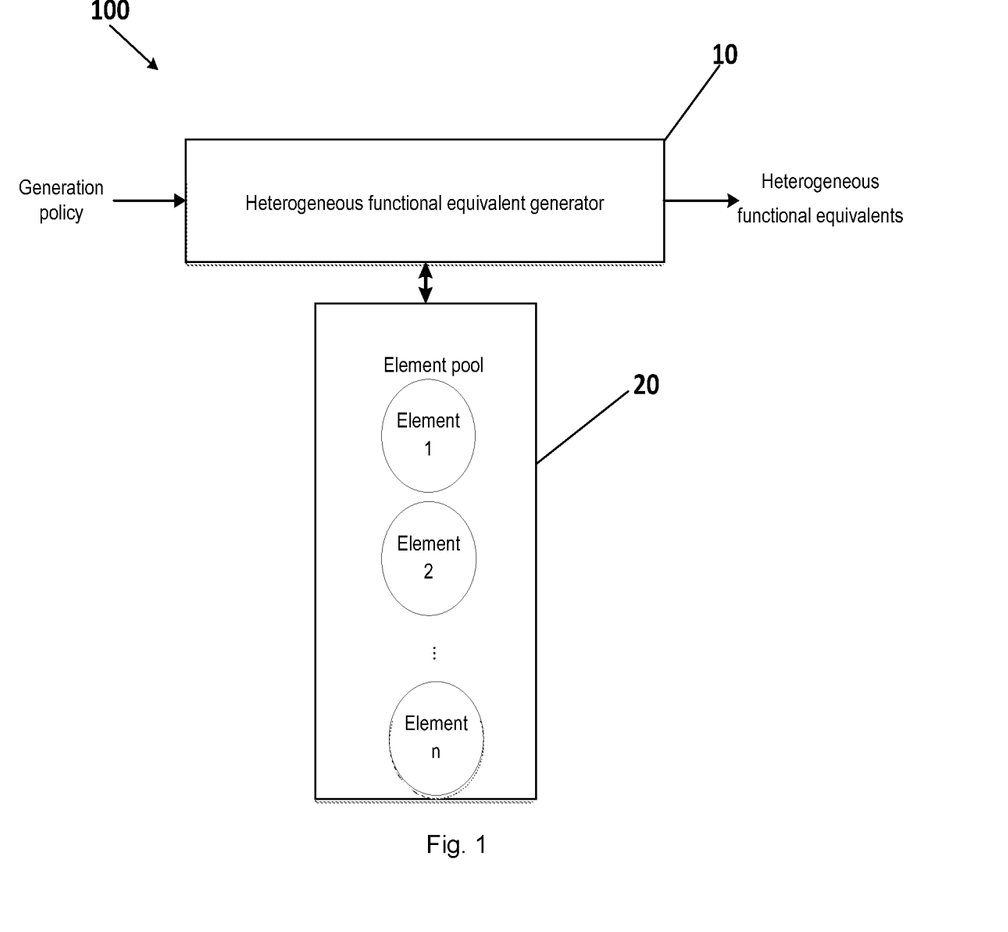
FIG. 1 is a schematic structural diagram of an apparatus for generating heterogeneous functional equivalent according to an embodiment of the present invention.

FIG. 1 shows an apparatus for generating heterogeneous functional equivalent 100. The apparatus 100 includes an element pool 20 including a plurality of elements, and a heterogeneous functional equivalent generator 10.

Each element in the element pool 20 is a basic unit for generating a heterogeneous functional equivalent. The element pool includes at least one element such as element 1, element 2, . . . , element n, and so on. Each element may be a system, a subsystem, a module, a function, a middleware, a component, etc. Alternatively, each element is a software, hardware, or software/hardware apparatus with a certain function.

The heterogeneous functional equivalent generator 10 is configured to obtain a generation policy, where the generation policy includes a function list for selecting an element according to a function and the number of to-be-generated heterogeneous functional equivalents.

The function list is a set of several functions included in the to-be-generated heterogeneous functional equivalents.

The heterogeneous functional equivalent generator 10 is further configured to select element sets corresponding to the number from the element pool 20 according to the generation policy, where each of the element sets is a set including at least one element for constructing a heterogeneous functional equivalent.

The heterogeneous functional equivalent generator 10 is further configured to generate the number of heterogeneous functional equivalents based on the selected element sets.

According to the apparatus for generating heterogeneous functional equivalent provided in this embodiment, different elements are selected from an element pool according to a generation policy, and these elements are combined to generate a plurality of different heterogeneous functional equivalents, so that sufficient heterogeneous functional equivalents are available to a heterogeneous redundant system, which resolves a problem in generating a heterogeneous functional equivalent in the heterogeneous redundant system.

In addition, a particular number of element sets are selected from an element pool according to a certain generation policy, so that generated heterogeneous functional equivalents are flexible and variable, which prevents an unknown defect, e.g., a trapdoor or a backdoor, in a network apparatus from being snooped and attacked, and improves network system security.

Figure 2:
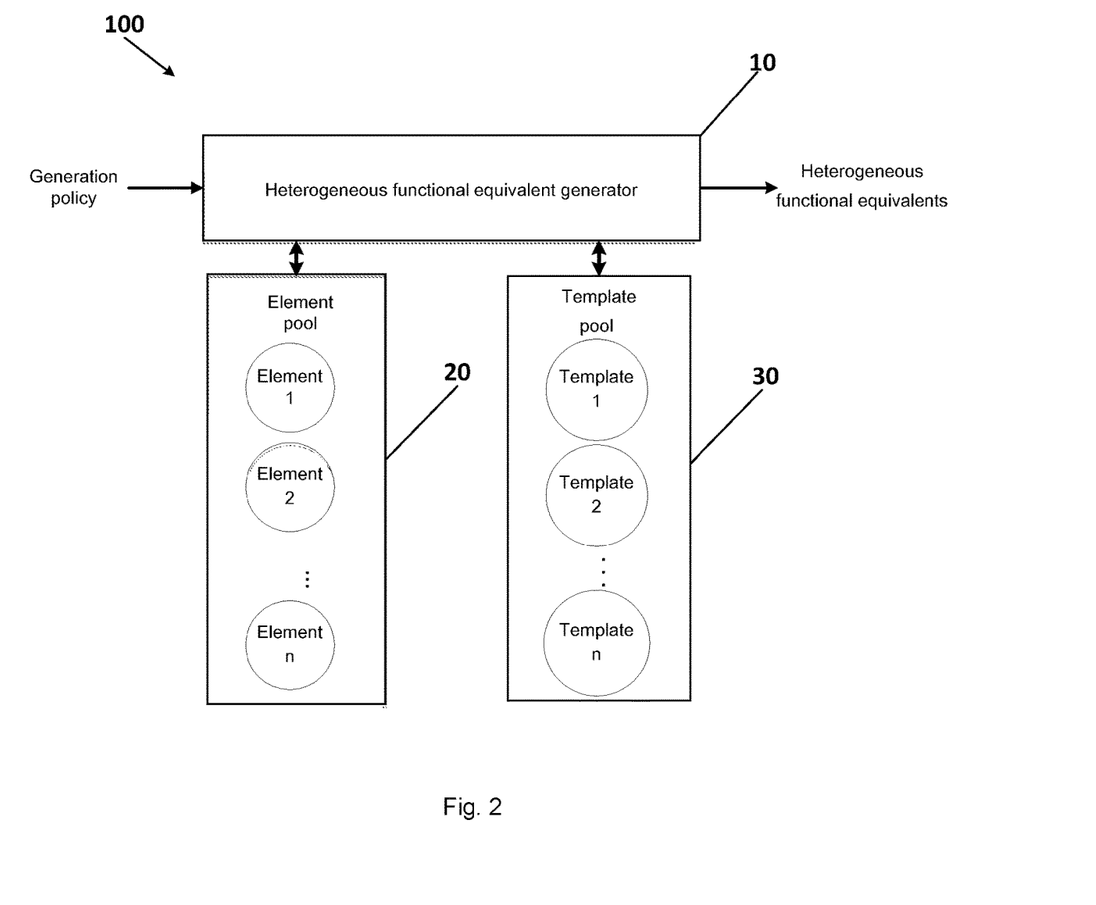
FIG. 2 is a schematic structural diagram of another apparatus for generating heterogeneous functional equivalent according to an embodiment of the present invention.

In a preferred embodiment, the apparatus further includes a template pool 30 including at least one template, the generation policy further includes at least one template selected from the template pool, e.g., template 1, template 2, . . . , or template n, and each template is used to generate a heterogeneous functional equivalent.

The generated heterogeneous functional equivalent may be implemented by software, hardware, or a combination thereof. A specific implementation may be determined according to a system implementation. The heterogeneous functional equivalent is implemented in various manners, and is output to outside by the heterogeneous functional equivalent generator.

According to an apparatus for generating heterogeneous functional equivalent provided in this embodiment, different elements are selected from an element pool according to a generation policy, and these elements are combined to generate a plurality of different heterogeneous functional equivalents, so that sufficient heterogeneous functional equivalents are available to a heterogeneous redundant system, which resolves problem in generating a heterogeneous functional equivalent generation in the heterogeneous redundant system.

In addition, a particular number of element sets are selected from an element pool according to a certain generation policy, so that generated heterogeneous functional equivalents are flexible and variable, which prevents an unknown defect, e.g., a trapdoor or a backdoor, in a network apparatus from being snooped and attacked, and improves network system security.

Further, the apparatus further includes a template pool 30 including at least one template, and the generation policy further includes at least one template selected from the template pool 30.

The heterogeneous functional equivalent generator 10 is further configured to combine or compile the element sets selected from the element pool 20 and the selected at least one template, to generate the number of heterogeneous functional equivalents. Different templates are selected from the template pool, so that the generated heterogeneous functional equivalents are more stable and secure.

The heterogeneous functional equivalent generator receives a generation policy that is input from outside, including a heterogeneous functional equivalent template, a function list, and a generation number. The heterogeneous functional equivalent template indicates the remaining part in a heterogeneous functional equivalent upon removal of functions in the function list from the heterogeneous functional equivalent, e.g., the remaining part in a software code engineering upon removal of several function implementation files. The function list indicates a set of function attributes included in heterogeneous functional equivalents. For example, a heterogeneous functional equivalent in accordance with an OSPF routing protocol includes function attributes such as route calculation and link state maintenance. The generation number is the number of heterogeneous functional equivalents needing to be generated.

In addition, the template includes a same template or different templates, and the different templates are different templates used to generate heterogeneous functional equivalents with a same function. Because each heterogeneous functional equivalent is formed by combining or compiling at least one element by using a template, different templates enable the generated heterogeneous functional equivalents to include a plurality of functions, and accordingly to provide different functions according to exterior services, while the exterior structures of these heterogeneous functional equivalents are the same, and function switching is performed only in the heterogeneous functional equivalents. Therefore, the capability of the heterogeneous functional equivalents in resisting intrusion and attack is enhanced, and network security is further improved.

Further, the heterogeneous functional equivalent generator is specifically further configured to search in the element pool according to the function list in the generation policy, and select the element sets corresponding to the number. By means of the function list in the generation policy, elements in the element pool are classified according to different functions, thereby making it convenient to search for and find an element for generating a heterogeneous functional equivalent.

In another embodiment, the heterogeneous functional equivalent generator is specifically further configured to obtain the attribute value of each element and the heterogeneous degree between any two elements in the element pool, and the attribute value of the template and the heterogeneous degree between two templates; and to select the element sets corresponding to the number from the element pool according to the generation policy, the attribute value of each element and the heterogeneous degree between any two same-function elements, and the attribute value of the template and the heterogeneous degree between the two templates.

The attribute value of each element includes reliability, complexity, or use frequency of each element, and the heterogeneous degree is a difference degree between any two elements with a same function.

The generated heterogeneous functional equivalents are of higher quality as for the overall attribute by calculating the attribute value of each element, the heterogeneous degree between two elements, and the attribute value of the selected template and the heterogeneous degree between different templates, and the capability of the heterogeneous functional equivalents in resisting external attack and snooping is enhanced.

In addition, the heterogeneous functional equivalent generator is configured to obtain the generation policy by reception from outside, generation from inside, or in a manner of combining reception from outside and generation from inside. In this way, the generated generation policy is random and variable, which prevents the generation policy from being easily attacked or intruded due to a monotonous mode.

The "from outside" includes input from outside, or a case where a policy generation apparatus is started as triggered by an exterior service request, and sends a generated policy to the heterogeneous functional equivalent generator. The "from inside" includes a case where all generation policies are stored in an internal generation policy database, and a generation policy is randomly or selectively invoked therefrom as triggered by an external request. The manner of combining reception from outside and generation from inside includes a case where a set of parameters are input from outside, and the generator performs calculation according to the set of parameters to generate a generation policy for generating a heterogeneous functional equivalent.

In another preferred embodiment, an element and a template for generating a heterogeneous functional equivalent are selected with further reference to the attribute value of each element and the heterogeneous degree between any two elements, and the attribute value of the template and the heterogeneous degree between two templates. A specific reference-based selection process is as follows:

(1) The heterogeneous functional equivalent generator specifically obtains the attribute value of each element and the heterogeneous degree between any two elements in the element pool, and the attribute value of the template and the heterogeneous degree between two templates, wherein the attribute value of each element includes reliability, complexity, or use frequency of each element, and is prestored in an attribute value database of the heterogeneous functional equivalent generator; the heterogeneous degree is a difference degree between any two elements with a same function, and is stored in the heterogeneous degree database of the heterogeneous functional equivalent generator based on function classification.

(2) The element sets corresponding to the number are selected from the element pool according to the generation policy, the attribute value of each element and the heterogeneous degree between any two same-function elements, and the attribute value of the template and the heterogeneous degree between the two templates.

If the number of the element sets selected for generating heterogeneous functional equivalents with a same function is equal to or greater than 2, the element set with the highest single-element-set attribute value is selected during selection based on attribute values, in order to achieve higher quality of the generated heterogeneous functional equivalents, where the single-element-set attribute value is the sum of attribute values of all elements in the element set. For selection based on heterogeneous degrees, the attribute values of all element sets are compared and the heterogeneous degree between any two element sets is compared with the heterogeneous degree between other two element sets, and two elements or element sets having a higher heterogeneous degree are selected.

In this embodiment, the heterogeneous functional equivalent generator calculates the attribute value of each element and the heterogeneous degree between two elements, and the attribute value of a selected template and the heterogeneous degree between different templates, so that generated heterogeneous functional equivalents are of higher quality as for the overall attribute, and the capability of the heterogeneous functional equivalents in resisting external attack and snooping is enhanced.

In a specific embodiment, for example, five heterogeneous functional equivalents need to be generated according to the generation policy, and the heterogeneous functional equivalent generator uses an internally preset generation policy. A process of generating the five heterogeneous functional equivalents is as follows:

The generator obtains, according to the generation policy, all element sets that can be used to generate heterogeneous functional equivalents, where each element set corresponds to one heterogeneous functional equivalent.

The attribute value of each element set (corresponding to one heterogeneous functional equivalent) and the heterogeneous degrees between element sets are evaluated according to the attribute values of current elements and the heterogeneous degrees between the elements. Then element sets that can achieve optimal indexes of attribute value and heterogeneous degree are selected from the element pool. For example, an element set A includes elements A1 and A2, and an element set B includes B1 and B2. The attribute values (which may be understood as metric value of reliability) of the elements A1, A2, B1, and B2 are x1, x2, y1, and y2. The elements A1 and B1 have a same function, and the heterogeneous degree therebetween is q(A1, B1). The elements A2 and B2 have a same function, and the heterogeneous degree therebetween is q(A2, B2). In this case, the attribute value of the element set A may be defined as x1+x2, the attribute value of the element set B may be defined as y1+y2, and the heterogeneous degree between the element sets A and B may be defined as q(A1, B1)+q(A2, B2).

Comparing the attribute value of the element set A with the attribute value of the element set B, i.e., comparing (x1+x2) with (y1+y2), the element set with a higher attribute value is selected as the element set for generating a heterogeneous functional equivalent. Similarly, Comparing the heterogeneous degrees q(A1, B1) with q(A2, B2), elements corresponding to a higher one of the two values are selected to generate a heterogeneous functional equivalent. For example, if q(A1, B1)>q(A2, B2), the elements A1 and B1 are selected as the elements for generating a heterogeneous functional equivalent.

Further, the heterogeneous functional equivalent generator is specifically further configured to search in the element pool according to the function list in the generation policy, and select element unit sets corresponding to the number.

In addition, if the generated heterogeneous functional equivalents are formed of a set including two or more element unit sets, the heterogeneous degrees between the element unit sets and attribute values of the element unit sets are also compared. The specific comparison process is the same as the process of comparing heterogeneous degrees for the individual elements and attribute values of the individual elements, and more detailed description is omitted herein.

In this embodiment, the attribute value and heterogeneous degree are calculated for element units, element unit sets, sets including element unit sets, and the element unit, the element unit set, and the set including element unit sets corresponding to the highest values are selected, so that the selected element unit is optimal, and accordingly the generated heterogeneous functional equivalent has an optimal function so as to provides a better service for an external request.

Figure 3:
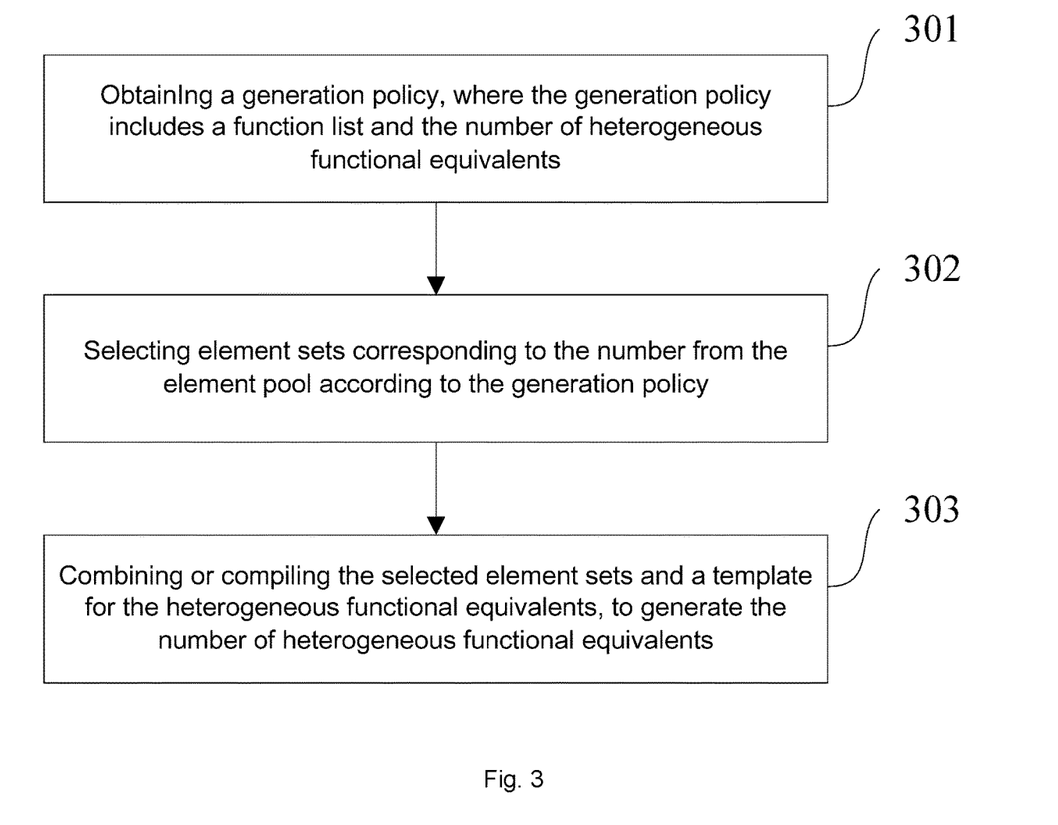
FIG. 3 is a flowchart of a method for generating heterogeneous functional equivalent according to an embodiment of the present invention.

This embodiment further provides a method for generating heterogeneous functional equivalent, corresponding to the apparatus embodiment. As shown in FIG. 3, the method includes:

Step 301: obtaining, by a heterogeneous functional equivalent generator, a generation policy, where the generation policy includes a function list for selecting one or more elements according to a function and the number of to-be-generated heterogeneous functional equivalents.

The generation policy may be obtained by reception from outside, generation from inside, or in a manner of combining reception from outside and generation from inside.

Step 302: Selecting element sets, corresponding to the number, from the element pool according to the generation policy, where each of the element sets is a set comprising at least one element for constructing a heterogeneous functional equivalent.

Specifically, the selecting of element sets corresponding to the number comprises:

searching in the element pool according to the function list in the generation policy, and selecting the element sets corresponding to the number.

Step 303: Combining the selected element sets to generate the number of heterogeneous functional equivalents.

According to the method for generating heterogeneous functional equivalent provided in this embodiment, different elements are selected from the element pool according to a generation policy, and these elements are combined to generate a plurality of different heterogeneous functional equivalents, so that sufficient heterogeneous functional equivalents are available to a heterogeneous redundant system, which resolves the problem in generating a heterogeneous functional equivalent generation in the heterogeneous redundant system.

In addition, a particular number of element sets are selected from the element pool according to a certain generation policy, so that the generated heterogeneous functional equivalents are flexible and variable, which prevents an unknown defect, e.g., a trapdoor or a backdoor, in a network apparatus from being snooped and attacked, and improves network system security.

In a preferred embodiment, if the generation policy further includes at least one template selected from the template pool, combining the selected element sets to generate the number of heterogeneous functional equivalents includes:

combining or compiling the element sets selected from the element pool and the selected at least one template, to generate the number of heterogeneous functional equivalents.

The template includes a same template or different templates, and the different templates are different templates used to generate heterogeneous functional equivalents with a same function. Different templates are selected from the template pool, so that the generated heterogeneous functional equivalents are more stable and secure.

In another embodiment, in order to achieve higher quality i.e., more functions and higher stability, of the generated heterogeneous functional equivalents, at the foregoing step 302, selecting element sets corresponding to the number from the element pool according to the generation policy further includes:

obtaining the attribute value of each element and the heterogeneous degree between any two elements in the element pool, and the attribute value of the template and the heterogeneous degree between two templates; and selecting the element sets corresponding to the number from the element pool according to the generation policy, the attribute value of each element and the heterogeneous degree between any two elements with a same function, and the attribute value of the template and the heterogeneous degree between the two templates, where the attribute value of each element includes reliability, complexity, or use frequency of each element, and the heterogeneous degree is the difference degree between any two elements with a same function.

The attribute value of an element set is a weighted value or an extreme value of the attribute values of all elements in the element set, and the attribute value of each element unit includes reliability, complexity, or use frequency of the element unit.

The heterogeneous degree between two element sets is a weighted value or an extreme value of heterogeneous degrees of element unit pairs corresponding to each of all functions in the both function sets, and the heterogeneous degree between element units is the difference degree between the two element units with a same function.

With reference to the attribute values of elements, the generated heterogeneous functional equivalents can have a better overall attribute value. With reference to the heterogeneous degrees between elements, the generated heterogeneous functional equivalents can have a better overall heterogeneous degree. Therefore, according to the apparatus and the method, not only a large number of heterogeneous functional equivalents but also the heterogeneous functional equivalents with high quality can be generated.

In addition, an embodiment of this application provides an element pool. The element pool is connected to the heterogeneous functional equivalent generator, and configured to provide an element set to the heterogeneous functional equivalent generator according to the generation policy. The element pool includes at least one element, each element has a function, and the element set is a set including at least one element for constructing a heterogeneous functional equivalent.

A template pool is further provided. The template pool is connected to the heterogeneous functional equivalent generator, and configured to provide a template, which is equivalent to a frame structure for combining selected elements, to the heterogeneous functional equivalent generator. The template pool includes at least one template, and each template is used to combine or compile the elements selected from the element pool, so that the generated heterogeneous functional equivalents have at least one function.

Figure 4:
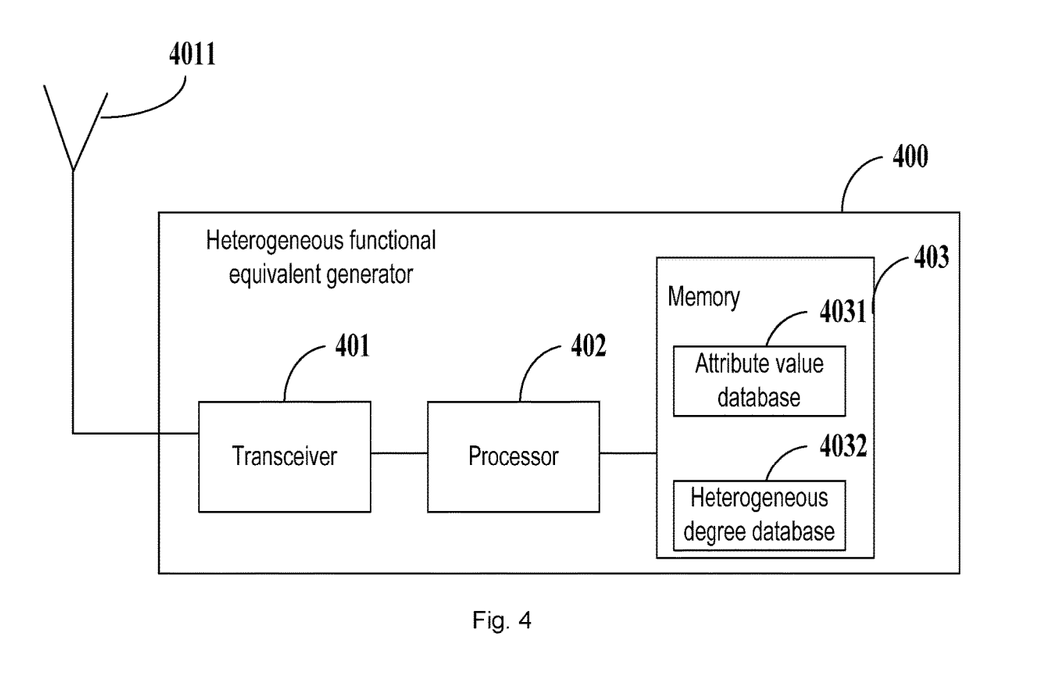
FIG. 4 is a schematic diagram of a heterogeneous functional equivalent generator according to an embodiment of the present invention.

As shown in FIG. 4, a heterogeneous functional equivalent generator 400 includes a transceiver 401 and a processor 402.

The transceiver 401 is configured to obtain a generation policy via an antenna 4011, where the generation policy includes a function list for selecting an element according to a function and the number of to-be-generated heterogeneous functional equivalents.

The processor 402 is configured to select the element sets corresponding to the number from the element pool according to the generation policy, and generate the number of heterogeneous functional equivalents based on the selected element sets, where each of the element sets is a set including at least one element for constructing a heterogeneous functional equivalent.

Optionally, if the generation policy further includes at least one template selected from the template pool, the processor is further configured to combine or compile the element sets selected from the element pool and the selected at least one template, to generate the number of heterogeneous functional equivalents.

Further, the processor 402 is configured to select the element sets corresponding to the number from the element pool according to the generation policy, the attribute value of each element and the heterogeneous degree between any two elements with a same function, and the attribute value of the template and the heterogeneous degree between two templates, where the attribute value of each element includes reliability, complexity, or use frequency of each element, and the heterogeneous degree is the difference degree between any two elements with a same function.

The processor 402 may be, e.g., a central processing unit (CPU), a network processor (NP), or a combination thereof. The processor may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL) device, or any combination thereof.

Further, the generator further includes a memory 403, where the memory 403 is configured to store the generation policy and the generated heterogeneous functional equivalents; and the transceiver 401 is further configured to output the generated heterogeneous functional equivalents.

The memory 403 further includes: an attribute value database 4031 and a heterogeneous degree database 4032.

The attribute value database 4031 is configured to store the attribute value of each element in the element pool; and the heterogeneous degree database 4032 is configured to store the heterogeneous degree between any two elements with the same function.

The processor 402 is further configured to calculate the attribute value of an element set according to the attribute value of each element, and calculate the heterogeneous degree between two element sets with the same function.

The memory 403 may be a volatile memory, a non-volatile memory, or a combination thereof. The volatile memory may be a random-access memory (RAM). The non-volatile memory may be a read-only memory (ROM), a flash memory, a hard disk drive (HDD), or a solid-state drive (SSD).

Those skilled in the art may clearly understand that, the technologies in the embodiments of the present invention may be implemented by software plus a necessary general hardware platform. Based on such an understanding, the spirit or the part of the technical solutions contributing to the prior art in accordance with the embodiments of the present invention may be implemented in a form of a software product.

The foregoing descriptions are merely specific implementations of the present invention. It should be noted that persons of ordinary skill in the art may make several improvements or polishing without departing from the principle of the present invention, and such improvements or polishing shall fall within the protection scope of the present invention.

What is claimed is:

1. An apparatus for generating heterogeneous functional equivalent, comprising: a heterogeneous functional equivalent generator and an element pool connected to the heterogeneous functional equivalent generator, where the element pool comprises at least one element, wherein
the heterogeneous functional equivalent generator is configured to obtain a generation policy, wherein the generation policy comprises a function list for selecting an element according to a function and a number of the heterogeneous functional equivalents to be generated;
the heterogeneous functional equivalent generator is further configured to select element sets corresponding to the number from the element pool according to the generation policy, wherein each of the element sets is a set comprising at least one element for constructing a heterogeneous functional equivalent;
the heterogeneous functional equivalent generator is further configured to generate the number of heterogeneous functional equivalents based on the selected element sets; and
a template pool comprising at least one template, and the generation policy further comprises at least one template selected from the template pool,
wherein the heterogeneous functional equivalent generator is further configured to combine or compile the element sets selected from the element pool and the selected at least one template, to generate the number of heterogeneous functional equivalents; and
wherein the heterogeneous functional equivalent generator is further configured to:
obtain the attribute value of each element and the heterogeneous degree between any two elements in the element pool, and the attribute value of the template and the heterogeneous degree between two templates; and
select the element sets corresponding to the number from the element pool according to the generation policy, the attribute value of each element and the heterogeneous degree between any two elements with a same function, and the attribute value of the template and the heterogeneous degree between the two templates.

2. The apparatus according to claim 1, wherein the heterogeneous functional equivalent generator is further configured to search in the element pool according to the function list in the generation policy, and select the element sets corresponding to the number.

3. The apparatus according to claim 1, wherein
the attribute value of each element comprises reliability, complexity, or use frequency of the each element, and the heterogeneous degree indicates a difference degree between the any two elements with the same function.

4. The apparatus according to claim 1, wherein the template comprises a same template or different templates, and the different templates indicate different templates used to generate heterogeneous functional equivalents with a same function.

5. The apparatus according to any claim 1, wherein the heterogeneous functional equivalent generator is configured to obtain the generation policy by reception from outside, generation from inside or in a manner of combining reception from outside and generation from inside.

6. A method for generating heterogeneous functional equivalent, comprising:
obtaining a generation policy, wherein the generation policy comprises a function list for selecting an element according to a function and a number of the heterogeneous functional equivalents to be generated;
selecting element sets corresponding to the number from the element pool according to the generation policy, wherein each of the element sets is a set comprising at least one element for constructing a heterogeneous functional equivalent;
generating the number of heterogeneous functional equivalents based on the selected element sets;
wherein if the generation policy further comprises at least one template selected from a template pool, combining the selected element sets to generate the number of heterogeneous functional equivalents comprises:
combining or compiling the element sets selected from the element pool and the selected at least one template, to generate the number of heterogeneous functional equivalents; and
wherein selecting element sets corresponding to the number from the element pool according to the generation policy further comprises:
obtaining an attribute value of each element and a heterogeneous degree between any two elements in the element pool, and an attribute value of the template and a heterogeneous degree between two templates; and
selecting the element sets corresponding to the number from the element pool according to the generation policy, the attribute value of each element and the heterogeneous degree between any two elements with a same function, and the attribute value of the template and the heterogeneous degree between the two templates.

7. The method according to claim 6, wherein selecting element sets corresponding to the number from the element pool according to the generation policy comprises:
searching in the element pool according to the function list in the generation policy, and selecting the element sets corresponding to the number.

8. The method according to claim 6, wherein
the attribute value of each element comprises reliability, complexity, or use frequency of the each element, and the heterogeneous degree indicates a difference degree between any two elements with the same function.

9. The method according to claim 6, wherein the template comprises a same template or different templates, and the different templates indicate different templates used to generate heterogeneous functional equivalents with a same function.

10. The method according to claim 6, wherein obtaining a generation policy comprises:
obtaining the generation policy by reception from outside, generation from inside or in a manner of combining reception from outside and generation from inside.

11. An element pool, wherein the element pool is connected to a heterogeneous functional equivalent generator, and configured to provide an element set to the heterogeneous functional equivalent generator according to a generation policy, wherein the element pool comprises at least one element, each element has a function, and the element set is a set comprising at least one element for constructing a heterogeneous functional equivalent, the heterogeneous functional equivalent generator, comprising a transceiver and a processor, wherein:
the transceiver is configured to obtain a generation policy, wherein the generation policy comprises a function list for selecting an element according to a function and a number of the heterogeneous functional equivalents to be generated; and the processor is configured to:
select element sets corresponding to the number from an element pool according to the generation policy, and generate the number of heterogeneous functional equivalents based on the selected element sets, wherein each of the element sets is a set comprising at least one element for constructing a heterogeneous functional equivalent; and
select the element sets corresponding to the number from the element pool according to the generation policy, an attribute value of each element and a heterogeneous degree between any two elements with a same function, and an attribute value of the template and a heterogeneous degree between two templates.

12. A template pool, wherein the template pool is connected to a heterogeneous functional equivalent generator, and configured to provide a template to the heterogeneous functional equivalent generator, wherein the template pool comprises at least one template, and each template is used to combine or compile the elements selected from an element pool, so that the generated heterogeneous functional equivalents have at least one function, the heterogeneous functional equivalent generator, comprising a transceiver and a processor, wherein:
the transceiver is configured to obtain a generation policy, wherein the generation policy comprises a function list for selecting an element according to a function and a number of the heterogeneous functional equivalents to be generated; and
the processor is configured to:
select element sets corresponding to the number from an element pool according to the generation policy, and generate the number of heterogeneous functional equivalents based on the selected element sets, wherein each of the element sets is a set comprising at least one element for constructing a heterogeneous functional equivalent; and
select the element sets corresponding to the number from the element pool according to the generation policy, an attribute value of each element and a heterogeneous degree between any two elements with a same function, and an attribute value of the template and a heterogeneous degree between two templates.

13. A heterogeneous functional equivalent generator, comprising a transceiver and a processor, wherein:
the transceiver is configured to obtain a generation policy, wherein the generation policy comprises a function list for selecting an element according to a function and a number of the heterogeneous functional equivalents to be generated; and
the processor is configured to select element sets corresponding to the number from an element pool according to the generation policy, and generate the number of heterogeneous functional equivalents based on the selected element sets, wherein each of the element sets is a set comprising at least one element for constructing a heterogeneous functional equivalent;
wherein if the generation policy further comprises at least one template selected from a template pool, the processor is further configured to combine or compile the element sets selected from the element pool and the selected at least one template, to generate the number of heterogeneous functional equivalents; and
wherein the processor is configured to select the element sets corresponding to the number from the element pool according to the generation policy, an attribute value of each element and a heterogeneous degree between any two elements with a same function, and an attribute value of the template and a heterogeneous degree between two templates.

14. The generator according to claim 13, wherein:
the attribute value of each element comprises reliability, complexity, or use frequency of each element, and the heterogeneous degree indicates a difference degree between the any two elements with the same function.

15. The generator according to claim 13, further comprising a memory, wherein the memory stores an attribute value database and a heterogeneous degree database, wherein
the attribute value database is configured to store the attribute value of each element in the element pool; and
the heterogeneous degree database is configured to store the heterogeneous degree between any two elements with a same function.

* * * * *